(12) United States Patent
Van Egeren et al.

(10) Patent No.: US 7,137,785 B2
(45) Date of Patent: Nov. 21, 2006

(54) WIND POWER STATION

(76) Inventors: Martin Van Egeren, Römerstrasse 181, D-50321 Brühl (DE); Klaus Krieger, Gartenstrasse 8, D-50321 Brühl (DE)

( * ) Notice: Subject to any disclaimer, the term of this patent is extended or adjusted under 35 U.S.C. 154(b) by 140 days.

(21) Appl. No.: 11/011,387

(22) Filed: Dec. 14, 2004

(65) Prior Publication Data

US 2005/0118026 A1 Jun. 2, 2005

Related U.S. Application Data

(63) Continuation of application No. PCT/DE03/01868, filed on Jun. 5, 2003.

(30) Foreign Application Priority Data

Jun. 14, 2002 (DE) .............................. 102 26 713

(51) Int. Cl.
*F03D 7/02* (2006.01)
*F03D 11/00* (2006.01)
(52) U.S. Cl. .................................................. 416/147
(58) Field of Classification Search ................ 416/147, 416/151, 155; 415/4.3, 4.5, 908; 290/44, 290/55
See application file for complete search history.

(56) References Cited

U.S. PATENT DOCUMENTS

| | | | |
|---|---|---|---|
| 3,469,633 A * | 9/1969 | Avondoglio | .................. 416/51 |
| 4,124,330 A * | 11/1978 | Barnes | .................... 416/157 B |
| 4,435,646 A | 3/1984 | Coleman et al. | |
| 4,495,423 A | 1/1985 | Rogers | |
| 4,743,163 A * | 5/1988 | Markunas et al. | ............ 416/44 |
| 6,158,953 A | 12/2000 | Lamont | |

FOREIGN PATENT DOCUMENTS

| | | |
|---|---|---|
| DE | 29 30 062 B1 | 2/1980 |
| DE | 36 28 626 C2 | 2/1988 |
| DE | 42 41 631 C2 | 6/1994 |
| DE | 199 41 630 C1 | 3/2001 |
| FR | 1.433.734 | 4/1966 |
| GB | 2 010 980 A | 7/1979 |
| GB | 2 233 400 A | 1/1991 |

* cited by examiner

*Primary Examiner*—Ninh H. Nguyen
(74) *Attorney, Agent, or Firm*—Laurence A. Greenberg; Werner H. Stemer; Ralph E. Locher

(57) ABSTRACT

A wind power station has at least one rotor. The rotor has at least one rotor blade, preferably two or more rotor blades. The rotor blade is operatively connected to a rotor shaft. The rotor blade can rotate about a substantially radially extending adjustment axis. At least one adjustment device is provided in order to adjust the rotor blade. Installation effort and labor effort as well as the costs are reduced by the adjustment device having at least one cam disk interacting with a control disk, and by the cam disk being disposed such that the rotation axis of the cam disk coincides with the adjustment axis of the rotor blade.

21 Claims, 9 Drawing Sheets

WIND POWER STATION

CROSS-REFERENCE TO RELATED APPLICATION

This is a continuing application, under 35 U.S.C. § 120, of copending international application No. PCT/DE03/01868, filed Jun. 5, 2003, which designated the United States; this application also claims the priority, under 35 U.S.C. § 119, of German patent application No. 102 26 713.8, filed Jun. 14, 2002; the prior applications are herewith incorporated by reference in their entirety.

BACKGROUND OF THE INVENTION

Field of the Invention

The invention relates to a wind power station having at least one rotor with the rotor having at least one rotor blade, preferably two or more rotor blades, wherein the rotor blade is operatively connected to a rotor shaft, wherein the rotor blade can rotate about an adjustment axis which extends substantially radially, and wherein at least one adjustment device is provided in order to adjust the rotor blade.

A wind power station in which the rotor has three rotor blades and in which the rotor blades are operatively connected to the rotor shaft via a rotor blade bearing and via shaft stubs which are mounted such that they can rotate, is described in German Patent No. DE 42 41 631 C2. Since the rotor blades are rotatably mounted, they can rotate—considered with respect to the axis of the rotor shaft—about a substantially radially extending adjustment axis or pitch control axis. A respective adjustment device or pitch control device which acts on the respective adjustment axis is thus provided for adjusting or positioning a respective one of the rotor blades. The adjustment device is in the form of a cam disk mechanism. The cam disk mechanism has a disk as well as a spring, which interacts with the disk, and a belt which interacts with the disk. The movement of the rotor blade about its adjustment axis or pitch control axis is controlled by the respective cam disk mechanism configured in the way described above. Each respective adjustment device forms a regulator/control element for the respective effective holding torque, which depends on the blade angle of the rotor blade.

Furthermore, German Patent No. DE-PS 36 28 626 describes a wind power station wherein the pitch of the rotor blades is controlled in a corresponding manner by an adjustment device in the form of a rod mechanism which rotates the rotor blades. For this purpose, the rotor has a rider which is mounted on a type of shaft such that it can be moved axially. Rods extend in each case from the rider to points on the rotor blades, with the corresponding rotor blades in turn being rotated, that is to say with the pitch being controlled, by movement of the rider along its shaft. The movement of the rider is in turn controlled by appropriate spring elements. As a result, an adjustment device for regulating or controlling the positions of the rotor blades is provided.

Conventional wind power stations, in particular the adjustment devices for adjusting or positioning the rotor blades, are not optimally configured. For example, in the case of the wind power station described in German Patent No. DE 42 41 631 C2, the power transmission chain for the adjustment device used here, specifically the cam disk mechanism, is not yet optimal. The elements which are used here, in particular the belt as well as the spring element are subject to wear during long-term use, in particular with the belt "becoming slack". This effect becomes greater the greater the extent to which the adjustment device that is used here is subject to weather influences, since the cam disk mechanism described here is in fact not protected against weather influences. This leads to a relatively large amount of play in the power transmission chain that is employed here, which means that the rotor blades cannot be optimally positioned and set. Further, each rotor blade has a separate adjustment device, and as a result the maintenance effort as well as the installation and adjustment effort are correspondingly high and the susceptibility of the overall installation is increased, which, overall, leads to increased repair and maintenance effort. Finally, the overall adjustment of all the rotor blades is not optimal, due to the large number of adjustment devices. The wind power station described in German Patent No. DE 36 28 626 C2 is not optimal either, since an adjustment device in the form of a rod mechanism is provided here in order to adjust the rotor blades. On the one hand, the elements provided here, specifically the spring elements as well as the rider, are once again also subject to external weather influences while, on the other hand, the power transmission chain that is provided here is once again subject to a corresponding amount of play, in particular as a result of the large number of linkages (tolerance chain), and this once again leads to the disadvantages already described above. In addition, the co-rotating rods in the rod mechanism have a disadvantageous aerodynamic effect and thus also reduce the overall power output of the wind power station. In summary, this means that the conventional wind power stations are not optimally configured.

SUMMARY OF THE INVENTION

It is accordingly an object of the invention to provide a wind power plant which overcomes the above-mentioned disadvantages of the heretofore-known wind power plants of this general type and in which the play and the tolerance chain in the power transmission chain for adjustment of the positions of the rotor blades are reduced, and in which in particular the installation and maintenance effort for such an adjustment device are reduced, and in which the costs associated with the adjustment are considerably minimized and in which, in particular, the adjustment/positioning of all the rotor blades is optimized, and in which the adjustment device is preferably well protected against weather influences.

With the foregoing and other objects in view there is provided, in accordance with the invention, a wind power station, including:

a rotor having a rotor blade;

a rotor shaft operatively connected to the rotor blade;

the rotor blade defining an adjustment axis extending substantially in a radial direction away from the rotor shaft, the rotor blade being rotatable about the adjustment axis;

an adjustment device for adjusting the rotor blade;

the adjustment device having a cam disk with a rotation axis, the cam disk being disposed such that the rotation axis of the cam disk coincides with the adjustment axis of the rotor blade; and a control disk interacting with the cam disk.

In other words, according to the invention, there is provided a wind power station having at least one rotor, wherein the rotor has at least one rotor blade, preferably two or more rotor blades, wherein the rotor blade is operatively connected to a rotor shaft, wherein the rotor blade can rotate about a substantially radially aligned adjustment axis or pitch control axis, wherein at least one adjustment device is provided in order to adjust the rotor blade, wherein the adjustment device has at least one cam disk which interacts with a control disk or control cam, and wherein the cam disk is disposed such that the rotation axis of the cam disk coincides with the adjustment axis.

Since the adjustment device is now configured such that it has a control disk on the one hand and a cam disk on the other hand, the adjustment device is less susceptible to wear. In particular, the belt that is used in conventional devices is eliminated. Furthermore, the adjustment device is configured such that it can be used jointly for two or more rotor blades, that is to say all the rotor blades can be adjusted jointly and appropriately through the use of the single adjustment device, specifically essentially with a control disk which preferably acts on two or more cam disks. For this purpose, the control disk and the cam disk interact appropriately by friction, as will be explained in more detail in the following text. It is advantageous that the adjustment device configured in this way can preferably be completely integrated in a rotor hub and, preferably, can be completely "encapsulated" there, so that it is protected against external weather influences, thus resulting in further advantages. In consequence, elements of the adjustment device are appropriately protected against weather influences, in particular against corrosion, icing, etc. In addition, there is likewise no need for the rod elements as used in the prior art for the rod mechanism used there. Since the adjustment device can be integrated in a rotor hub, it thus has aerodynamic advantages, which in turn lead to an increase in the power of the entire wind power station. Overall, this avoids the disadvantages described initially and achieves major advantages.

According to another feature of the invention, the rotor has a rotor hub and the control disk is disposed on a shaft within the rotor hub such that the control disk is axially movable on the shaft.

According to yet another feature of the invention, the control disk is mounted rotatably on the shaft via a bearing.

According to a further feature of the invention, the control disk makes friction contact with the cam disk such that the control disk and the cam disk are frictionally coupled.

According to another feature of the invention, a spring element forces the control disk in a direction toward the cam disk.

According to yet another feature of the invention, the spring element is mounted rotatably such that the spring element and the control disk are rotatable.

According to a further feature of the invention, the rotor shaft defines a rotor shaft rotation axis, and the control disk defines a control disk rotation axis corresponding to the rotor shaft rotation axis.

According to another feature of the invention, the rotor blade has a shaft stub with a lower end; the cam disk is disposed at the lower end of the shaft stub and is rotationally fixed with respect to the shaft stub; and the shaft stub defines a shaft stub axis such that the shaft stub axis coincides with the adjustment axis of the rotor blade.

According to yet another feature of the invention, the rotor has a rotor hub with a circumferential wall; and the shaft stub is rotatably mounted in the circumferential wall of the rotor hub.

According to a further feature of the invention, the cam disk has a contour profile with two extremes for providing a neutral position or null position for the cam disk on the control disk.

According to another feature of the invention, three rotor blades are provided; and the shaft stubs of the rotor blades are rotatably mounted in the circumferential wall of the rotor hub.

According to yet another feature of the invention, the adjustment device is disposed within the rotor hub.

According to another feature of the invention, the shaft for the control disk is a hollow shaft configured such that the rotor hub is connected, via the connecting element, to the rotor shaft for transmitting torque.

According to a further feature of the invention, the rotor blade has a pressure point; and the rotor blade is disposed such that the pressure point of the rotor blade lags behind the adjustment axis of the rotor blade.

According to yet a further feature of the invention, the rotor defines a general rotor plane; and the rotor blade is slightly inclined such that the adjustment axis of the rotor blade forms an acute angle with the general rotor plane.

According to another feature of the invention, the adjustment device is configured to control a rotation speed and/or a power of the wind power station.

According to yet another feature of the invention, the cam disk, the control disk and the spring element are disposed and configured such that a holding torque or holding force is transmitted to the rotor blade for controlling a position of the rotor blade.

According to another feature of the invention, the cam disk, the control disk and the spring element are disposed and configured such that a holding torque with a given characteristic is transmitted to the rotor blade and such that an adjustment angle range for the rotor blade is governed by the given characteristic of the holding torque.

According to yet a further feature of the invention, the adjustment device is configured such that a rated power of the wind power station remains substantially constant above a given wind speed.

According to another feature of the invention, the adjustment device is configured such that the rotor has a relatively higher rate of increase in no-load rotation speed with increasing wind speeds for wind speeds below a given wind speed value; and the rotor has a relatively lower rate of increase in no-load rotation speed with increasing wind speeds for wind speeds above the given wind speed value. In other words, the adjustment device is configured such that the no-load rotation speed of the rotor rises only slightly when the wind speed is above a given wind speed.

Other features which are considered as characteristic for the invention are set forth in the appended claims.

Although the invention is illustrated and described herein as embodied in a wind power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
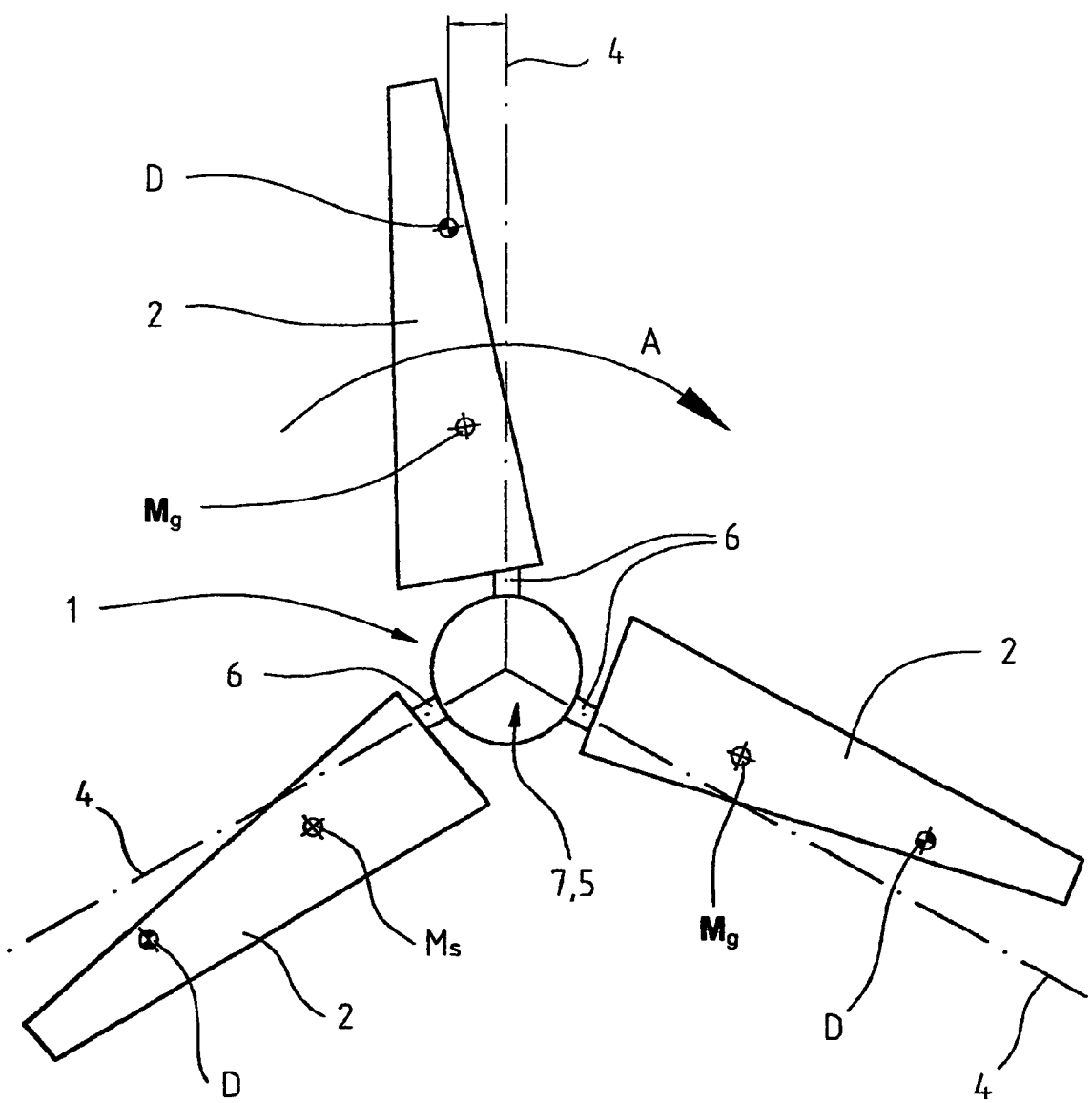
FIG. 1 is a diagrammatic front view of the rotor of the wind power station according to the invention.

Referring now to the figures of the drawings in detail and first, particularly, to FIGS. 1 to 6 which show major components of a wind power station. The wind power station has at least one rotor 1 with at least one rotor blade 2, preferably with two or more rotor blades 2, and in this case with three rotor blades 2. The rotor blades 2 are effectively connected via a rotor hub bearing to a rotor shaft 3 which is disposed essentially horizontally. In this case, the rotor blades 2 can rotate about an essentially radially aligned adjustment axis or pitch control axis 4, with at least one adjustment device or pitch control device 5, which acts on the adjustment axis 4, being provided for adjustment of the rotor blades 2.

The rotor 1 illustrated here for the wind power station, in this case has three rotor blades 2. However, it is feasible for the wind power station to have two or more rotor blades 2, by way of example four rotor blades, or else only two, and where possible it may even also have only one rotor blade 2. In this case, when an appropriate wind speed $v_{wind}$ strikes the rotor blades 2, this results in a rotational movement of the rotor shaft 3, since the rotor blades 2 are effectively connected to the rotor shaft 3, as will be explained in more detail in the following text. The rotor shaft 3 is disposed such that it runs essentially horizontally, although this need not always be the case. It is also in fact feasible for the rotor shaft 3 to be disposed such that it is slightly inclined or even vertical. However, the rotor shaft 3 is preferably disposed such that it runs essentially horizontally, and is correspondingly effectively connected to a generator in order to produce corresponding energy or electricity.

The rotor blades 2 each have a shaft stub 6 which is mounted within a rotor hub 7 such that the shaft stub 6 can rotate. As can be seen from FIG. 1 the adjustment axis 4 is defined essentially by the axis of the shaft stub 6, or the adjustment axis 4 is defined by the axis of the bearing 15. As can likewise be seen well from FIG. 1, the individual rotor blades 2, that is to say the respective longitudinal axes of the rotor blades 2, do not coincide with the respective adjustment axes 4, but are disposed such that the pressure point D on each of the rotor blades 2 runs behind the respective adjustment axis 4 during rotation of the rotor 1. The rotor movement of the rotor 1 is represented by the corresponding arrow A in FIG. 1.

Figure 2:
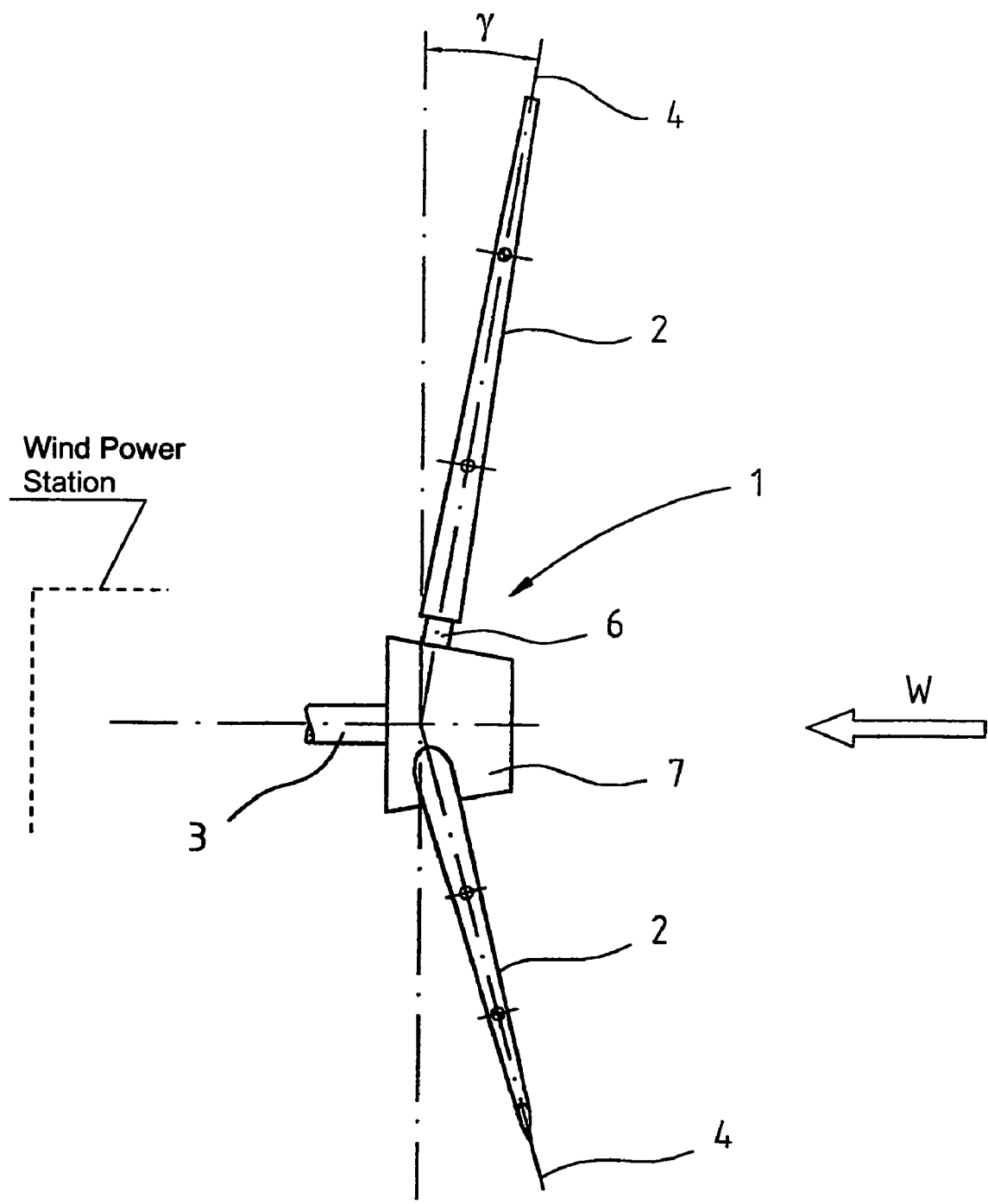
FIG. 2 is a diagrammatic side view of the rotor of the wind power station according to the invention.

FIG. 2 now shows a schematic illustration of the rotor 1 from the side. The overall wind power station is schematically indicated with a dashed line. The wind direction is indicated by an arrow W. FIG. 2 shows the rotor blades 2, which are mounted in the rotor hub 7 via the shaft stubs 6, as well as the rotor shaft 3, which is indicated schematically here and is illustrated only partially. The illustration in FIG. 2 shows that the adjustment axes 4 admittedly run essentially radially with respect to the rotor shaft 3, but with the adjustment axes 4 of the rotor blades 2 preferably being essentially inclined slightly forward so that the rotor blades 2 form an acute angle γ with the general rotor plane. The configuration of the rotor blade 2, the formation of an angle γ and the formation of a lagging pressure point D result in an adjustment torque or pitch control moment in the direction of the windmilling position during operation of the wind power station.

The disadvantages described initially are now avoided by the adjustment device 5 having at least one cam disk 9 which interacts with a control disk or control cam 8, and by the cam disk 9 being disposed such that the rotation axis of the cam disk 9 coincides with the adjustment axis 4. Since the adjustment device 5 now has at least one control disk 8 and at least one cam disk 9, which essentially interact with one another by friction, the disadvantages mentioned initially are avoided to a considerable extent. On the one hand, there is no longer any need to provide an additional belt element, and the wear phenomena are now considerably reduced since the adjustment device 5 configured in this way is in fact not susceptible to any significant wear. Furthermore, there is no need to provide any complex additional joints, etc., which are subject to wear, so that a short force transmission chain can be provided, with the force being transmitted without any play, so that tight tolerances can be achieved and the rotor blade 2 can be set to a precise blade angle through the use of the adjustment device 5 configured in this way, as will also be explained in more detail in the following text.

Furthermore, the control elements or regulating elements which the adjustment device 5 has are very well protected against weather influences such as corrosion and icing, because the adjustment device 5 can be completely integrated within the rotor hub 7, as will likewise be described in detail in the following text. Overall, this results in a cost-effective, wear-free adjustment device 5 which, as a result, has virtually no tolerances and through the use of which the rotor blades 2 can be positioned optimally.

Figure 3:
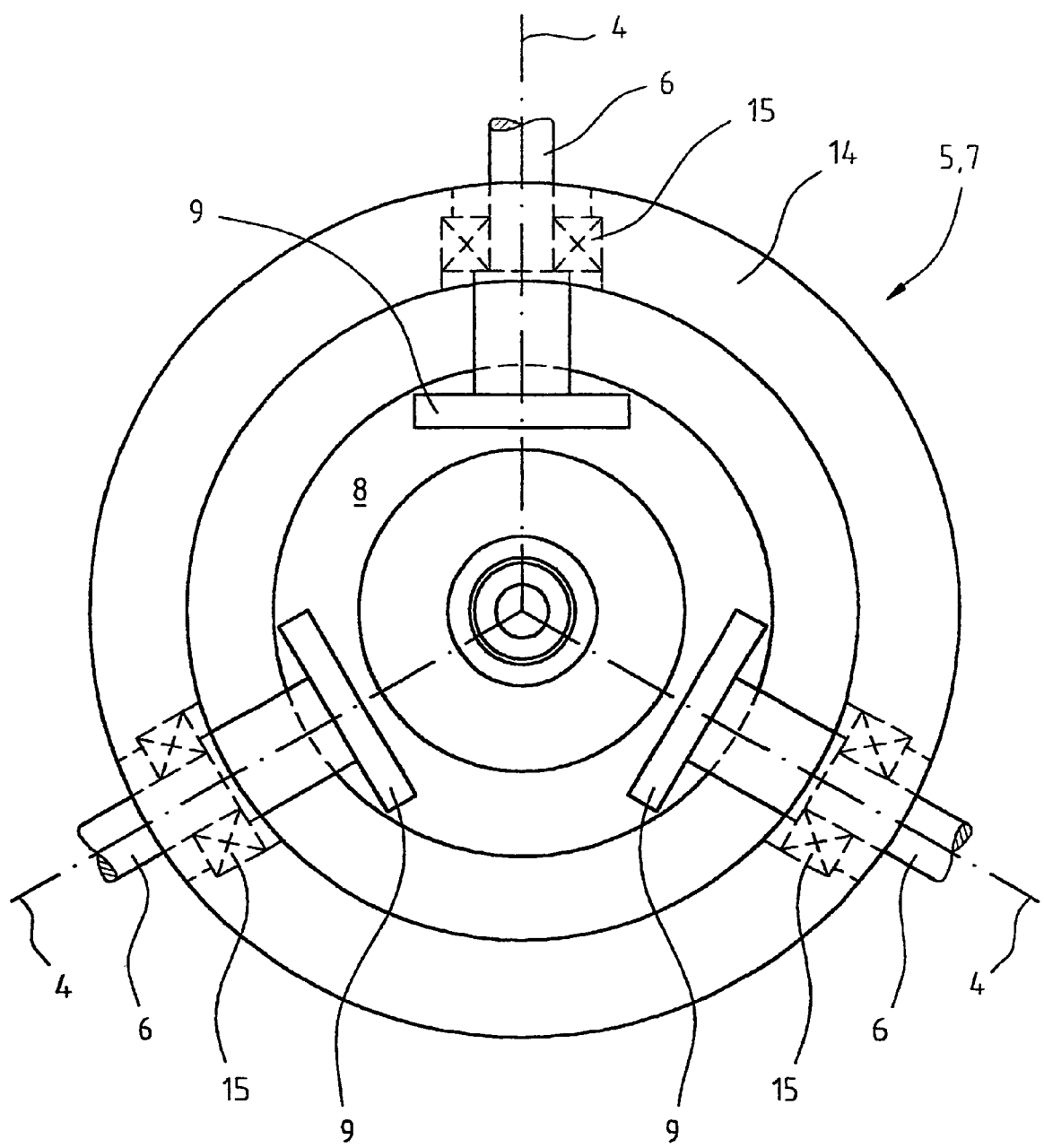
FIG. 3 is a diagrammatic front view of the interior of the rotor hub, illustrating major components of the adjustment device as seen when looking into the "opened rotor hub" according to the invention.
Figure 4:
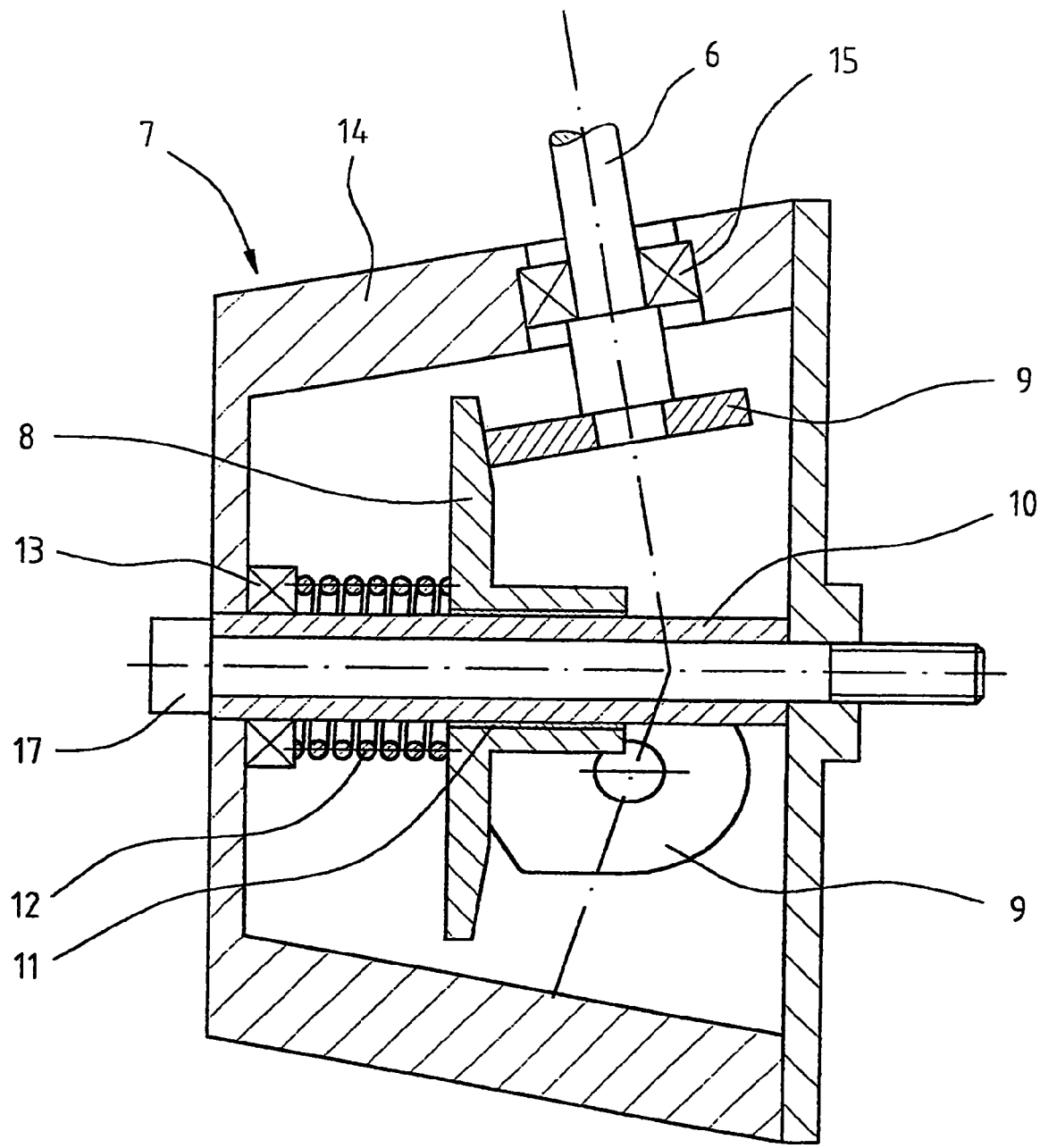
FIG. 4 is a diagrammatic sectional side view of the rotor hub illustrating the adjustment device integrated in the rotor hub according to the invention.
Figure 5:
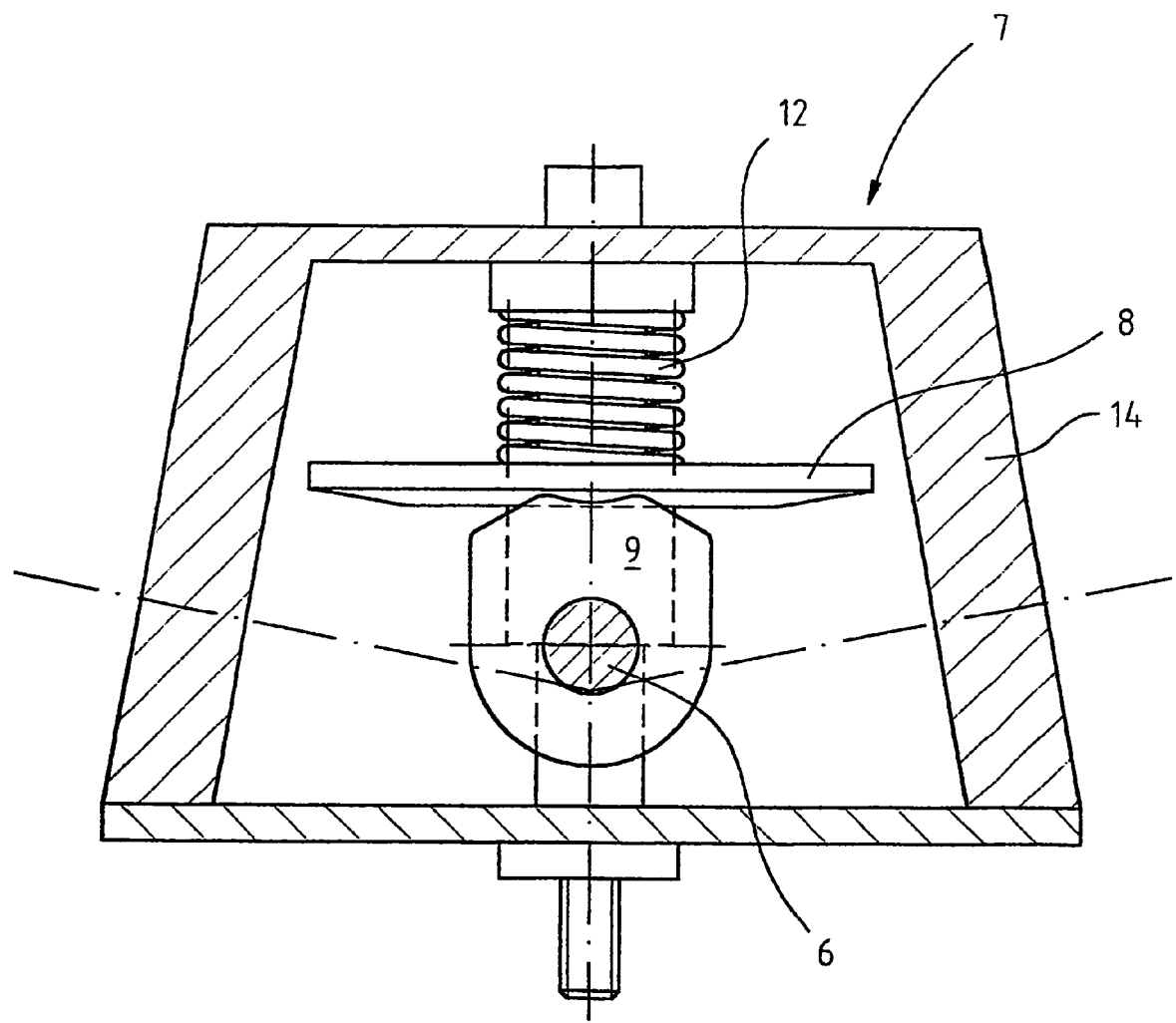
FIG. 5 is a diagrammatic, partially sectional top view of the rotor hub with an integrated adjustment device according to the invention.

The preferred embodiment of the adjustment device 5 described here, has, as can be seen from FIGS. 3 to 6, a control disk 8 and three cam disks 9. As can be seen from FIG. 4, a control disk 8 is arranged on a shaft 10 within the rotor hub 7, and can be moved axially on it. The control disk 8 is mounted on the shaft 10 through the use of a bearing 11, such that it can rotate. FIG. 4 and FIG. 5 clearly show that the individual cam disks 9 make a friction contact with the control disk 8 such that they are frictionally coupled. In this case, the control disk 8 has force applied to it by a spring element 12 in the direction of the cam disks 9. As can be seen from FIG. 4, the spring element 12 is also mounted through the use of a bearing 13 such that it can rotate, thus allowing rotation of the control disk 8 as well as corresponding rotation of the spring element 12. The rotation axis of the control disk 8 corresponds to the rotation axis of the rotor shaft 3.

FIGS. 3 to 5 clearly show that the adjustment device 5 in this case essentially includes a control disk 8 and three cam disks 9, as well as the bearing for the control disk 8 and the spring element 12. The number of cam disks 9 is essentially dependent on the number of rotor blades 2. The cam disks 9 are each located at the lower ends of the shaft stubs 6 of the rotor blades 2, and are arranged here such that they rotate together. In this case, the axes of the individual shaft stubs 6 define the pitch control axes 4 of the respective rotor blades 2. The respective shaft stub 6 is mounted within the circumferential wall 14 of the rotor hub 7 such that it can rotate. A corresponding bearing 15 is in each case provided for this purpose. Depending on the number of rotor blades 2, a corresponding number of shaft stubs 6 and cam disks 9 are now also provided. It is thus perfectly possible for the adjustment device 5 therefore to have preferably two, four or even more cam disks 9, which interact with the corresponding control disk 8. This is dependent on the respective embodiment of the wind power station, in particular of the rotor 1.

The materials from which the control disk 8 and the cam disks 9 are produced may also differ, depending on the respective application and, in particular, on the forces which occur. Steel as well as steel alloys, or else appropriate other cast materials or appropriate mixtures such as plastic may be used for this purpose. The critical factor is to ensure a point contact between the control disk 8 and the respective cam disk 9. Overall, this allows the control disk 8 and the cam disk 9 to be mounted in an optimum manner.

The configuration of the spring element 12, in this case in the form of a helical compression spring, has also been found to be a preferred embodiment. However, it is also feasible to provide other spring elements or resilient elements, for example plate springs or the like for this purpose.

One major advantage is that the control disk 8 can rotate and that the spring element 12 is also mounted such that it can rotate, as will be explained in more detail in the following text. This also results in wear phenomena, in particular erosion between the control disk 8 and the cam disks 9, being considerably minimized, because the capability of the control disk 8 to rotate together with the helical compression spring results in a small amount of friction wear and in high control quality for the adjustment device 5.

Materials which ensure a good contact between the elements are thus preferred for use as the materials for the control disk 8 and cam disks 9, that is to say in particular materials which ensure that the cam disk 9 rolls well on the control disk 8. In this case, it is particularly advantageous for the entire adjustment device 5 to be arranged essentially within the rotor hub 7, so that the individual elements are in this case protected against weather influences. As a result of this the required contacts that occur are not reduced by the ingress of water or other weather influences, such as icing or dirt, so that the interaction of the elements is not adversely affected.

Figure 6:
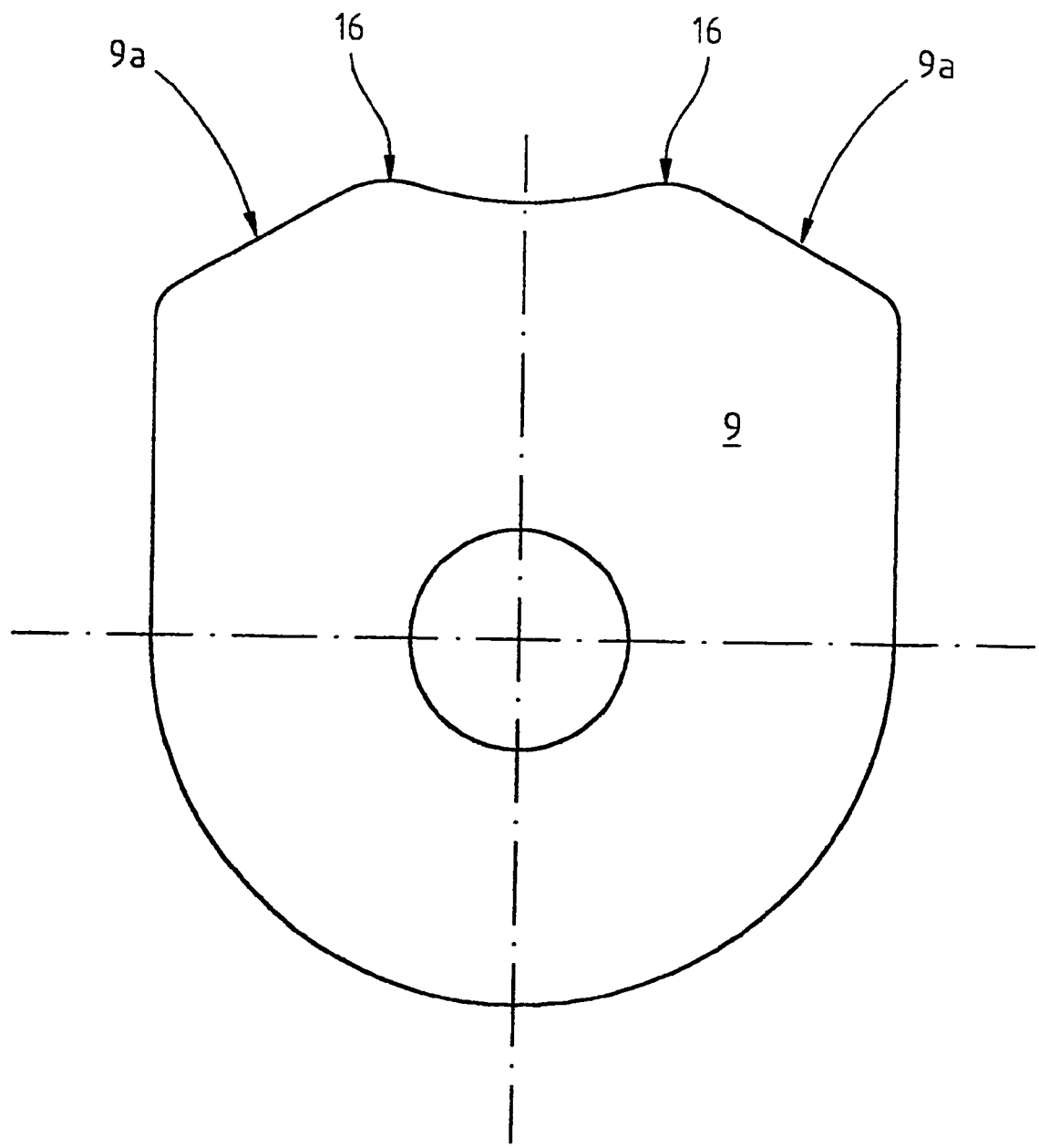
FIG. 6 is a diagrammatic, enlarged front view of a single cam disk according to the invention.

FIGS. 5 and 6 show a cam disk 9 from the side, illustrated schematically. The upper area of the cam disk 9 has a corresponding contour 9a. As can clearly be seen from FIG. 5 and FIG. 6, the contour profile 9a of the cam disk 9 has two extremes 16. These extremes 16 are used to provide the "null position" or the neutral position of the cam disk 9 on the control disk 8. In other words, the extremes 16 uniquely define the null position of the cam disk 9 relative to the control disk 8. This ensures optimum setting of the neutral position for the rotor blades 2.

As can be seen from FIG. 4 and from FIG. 5, the adjustment device 5 is arranged and integrated within the rotor hub 7. The shaft 10 on which the control disk 8 is mounted is hollow, so that the rotor hub 7 can be connected through the use of a connecting element 17, preferably through the use of a screw element, to the rotor shaft 3 in order to transmit the torque of the rotor 1. In other words, the adjustment device 5 is configured such that, on the one hand, it can be integrated within the rotor hub 7 while, on the other hand, the rotor hub 7 can be screwed in a simple manner to the rotor shaft 3 through the use of a connecting element 17, and can preferably be screwed to the rotor shaft 3 through the use of a screw element. This makes it easier to install the entire wind power station, since only one connecting element is required for installation, which is another major advantage. The adjustment device 5 and the rotor hub 7 thus form a module which can be installed easily.

The adjustment device 5 now allows the power and/or rotation speed of the wind power station to be controlled. This will be explained in more detail in the following text.

The adjustment device 5 is thus used as an open-loop and/or closed-loop control of the power P or rotation speed n of the wind power station. The configuration of the cam disk 9, or of the respective cam disks 9, and of the spring element 12 are of particular importance in this case, specifically of the spring force provided here by the spring element 12, as well as the configuration of the cam contour 9a of the cam disk 9.

All of these elements, that is to say the cam disks 9, the control disk 8 and the spring element 12, are now configured and arranged such that the holding torque or the holding forces can be transmitted appropriately to the rotor blades 2, so that their position can be subjected to a corresponding open-loop or closed-loop control. In this context, reference should once again be made to FIG. 1. This clearly shows that the pressure point D on the rotor blades 2 lags behind the respective adjustment axis 4. This results in the case of an incident flow with a wind speed $v_{wind} > v_{rated}$, as illustrated in FIG. 2, in the rotor blades 2 being rotated about the adjustment axis 4, in particular, because the pressure point D is actually not located on the respective adjustment axis 4.

Figure 7:
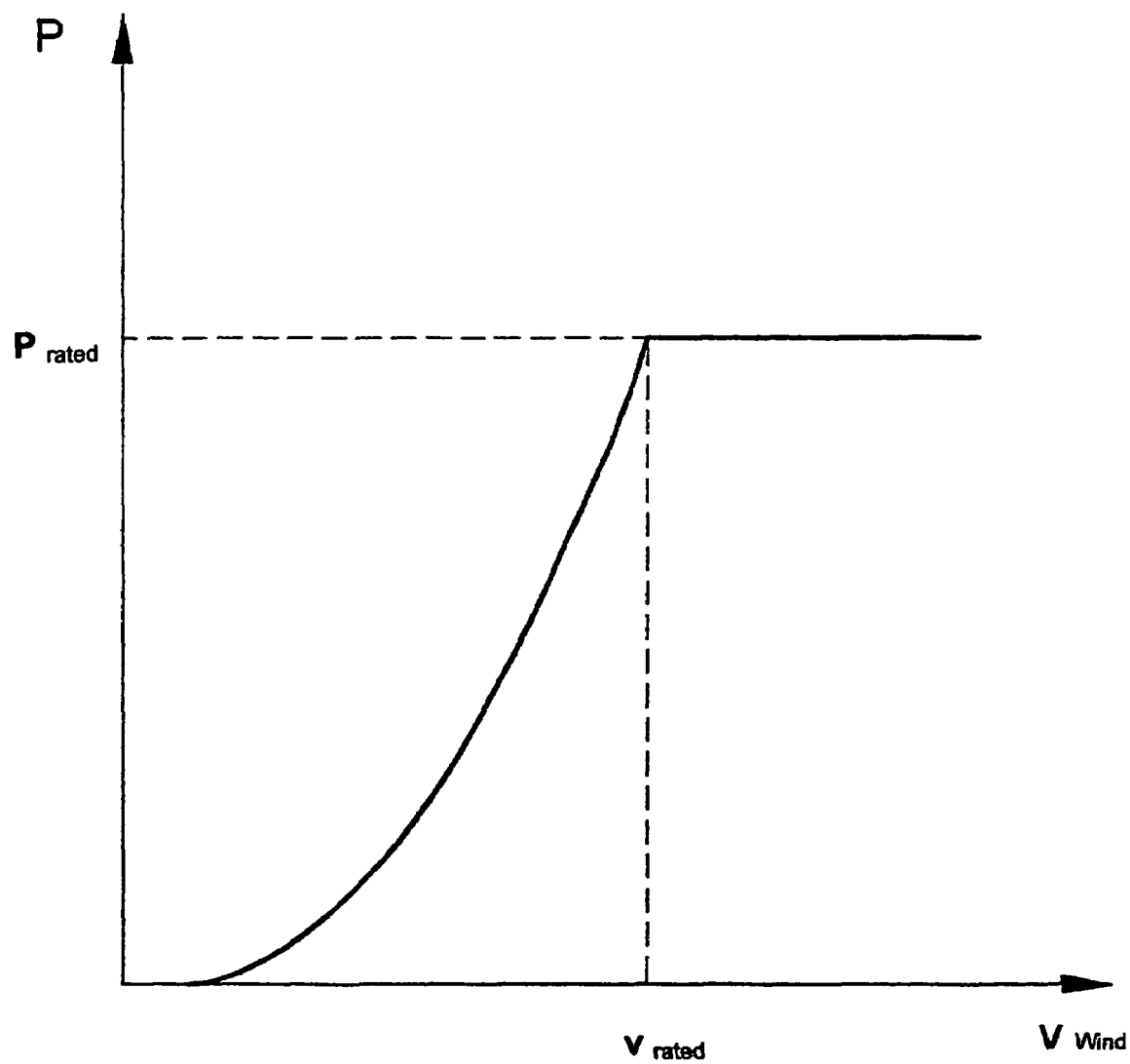
FIG. 7 is a graph for illustrating a power characteristic for the wind power station according to the invention, as a function of the wind speed.

The adjustment device 5 is now configured such that the power $P_{rated}$ of the wind power station remains essentially constant above a specific wind speed $v_{rated}$, as is illustrated in FIG. 7. FIG. 7 shows a rise in the power $P_{rated}$ of the wind power station as the wind speed $v_{wind}$ increases up to the value $v_{rated}$. Above the wind speed $v_{rated}$, the wind power station is thus regulated, for safety reasons.

Figure 8:
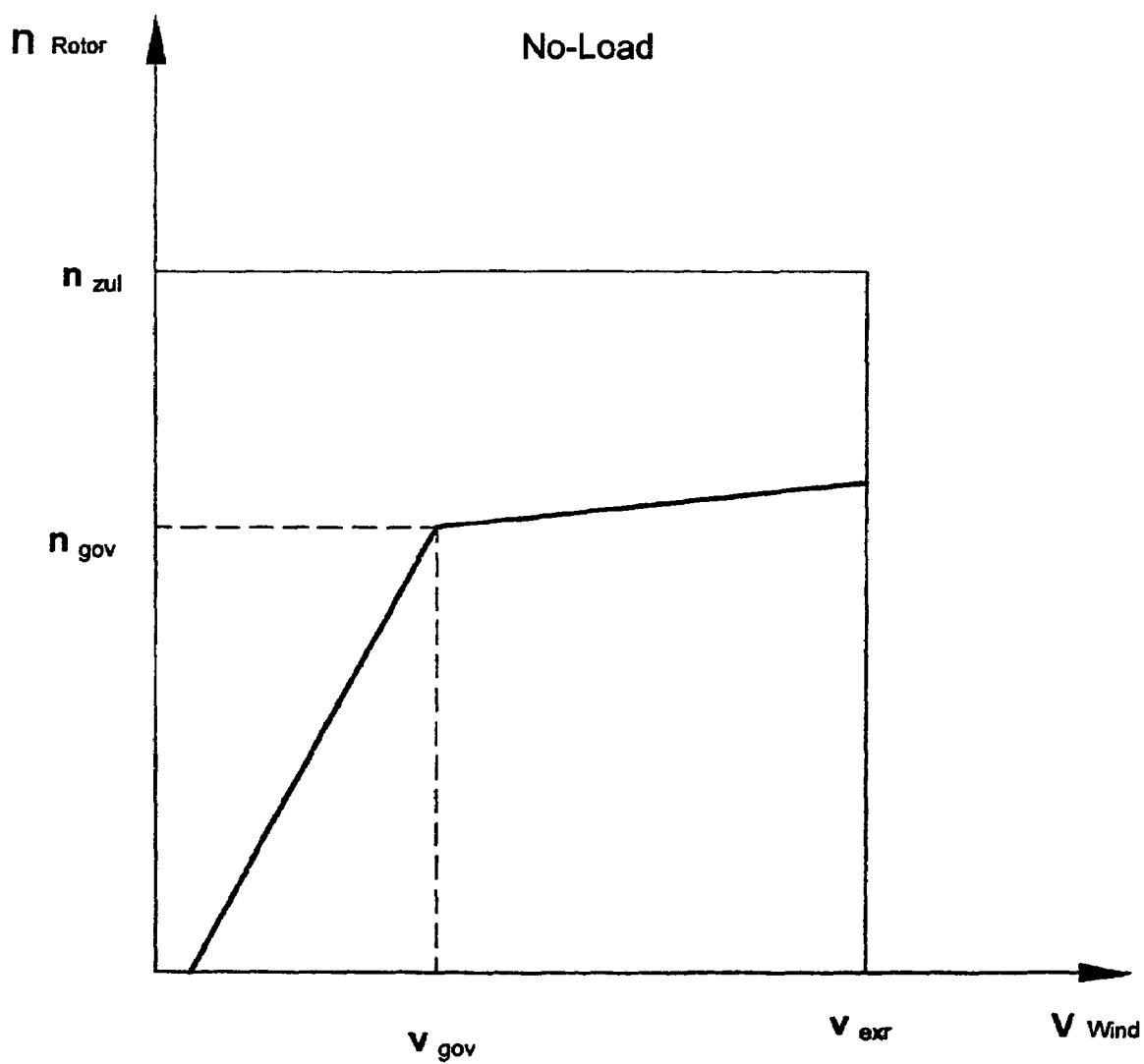
FIG. 8 is a graph for illustrating a no-load rotation speed characteristic for the wind power station according to the invention, as a function of the wind speed.

FIG. 8 now shows that the adjustment device 5 is implemented and/or configured such that the no-load rotation speed or idling rotation speed $n_{rotor}$ of the rotor 1 essentially rises only slightly when the wind speed is above a specific wind speed, in this case above the value $v_{gov}$, specifically, up to the wind speed $v_{ext}$. In consequence, the rotation speed of the rotor is regulated for safety reasons above the wind speed $v_{gov}$ such that the rotation speed of the rotor says below $n_{zul}$. This applies in particular to a wind power station whose rotor blades 2 are inclined with respect to the rotor plane, that is to say they have a "coning angle." Due to the likewise "lagging center of gravity $M_g$" in conjunction with the coning angle γ that is provided, the respective centrifugal forces likewise produce an adjusting moment which acts on the positioning of the rotor blade 2. The angle γ is also decreased while the rotor blades 2 are adjusted in the direction of the windmilling position.

Figure 9:
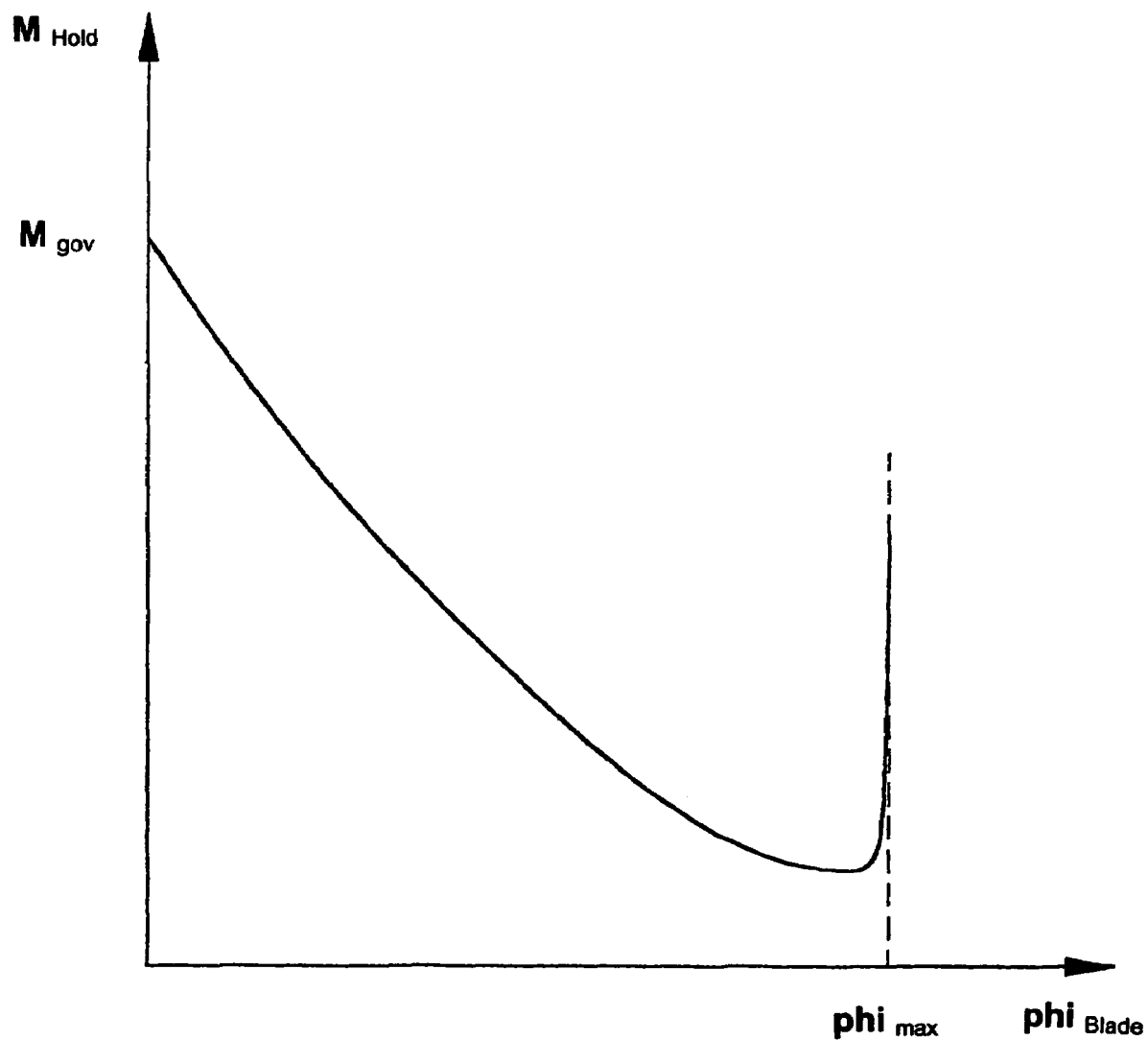
FIG. 9 is a graph illustrating the characteristic of the holding torque for positioning the rotor blades, as a function of the adjustment angle, that is to say the "regulator characteristic" of the adjustment device according to the invention.

FIG. 7, which shows the power characteristics, and FIG. 8, which shows the no-load rotation speed characteristic of the wind power station with the adjustment device 5, show that the cam disks 9, the control disk 8 and the spring elements 12 are configured and/or arranged, and interact, such that the pitch angle of the rotor blades 2 is subject to open-loop or closed-loop controls. FIG. 9 shows a sharp drop in the holding torque $M_{Hold}$ beyond the regulating point or governing point $M_{gov}$. As can be seen from FIG. 9, the holding torque M decreases as the pitch angle or adjustment angle $phi_{Blade}$ increases, to be precise as far as the end of the adjustment angle range, where a sharp rise occurs at $phi_{max}$. This rise is produced by the contours 9a of the cam disks 9, specifically by the "outer corner points." FIG. 9 thus shows the "control characteristic" of the adjustment device 5. The "controller characteristic" of the adjustment device 5 is thus defined essentially by the configuration/contour profile 9a of all the cam disks and the spring element 12.

Overall, major advantages are achieved for a wind power station having an adjustment device 5 configured in this way, with the labor, installation and maintenance effort being reduced, the wear phenomena being reduced, a good regulated behavior being achievable for the adjustment device 5, and all the advantages being achievable with only minor costs.

We claim:

1. A wind power station, comprising:
   a rotor having a rotor blade;
   a rotor shaft operatively connected to said rotor blade;
   said rotor blade defining an adjustment axis extending substantially in a radial direction away from said rotor shaft, said rotor blade being rotatable about the adjustment axis;
   an adjustment device for adjusting said rotor blade;
   said adjustment device having a cam disk with a rotation axis, said cam disk being disposed such that the rotation axis of said cam disk coincides with the adjustment axis of said rotor blade; and
   a control disk interacting with said cam disk.

2. The wind power station according to claim 1, wherein:
   said rotor has a rotor hub; and
   said control disk is disposed on a shaft within said rotor hub such that said control disk is axially movable on said shaft.

3. The wind power station according to claim 2, including a bearing, said control disk being mounted rotatably on said shaft via said bearing.

4. The wind power station according to claim 2, including:
   a connecting element; and
   said shaft for said control disk being a hollow shaft configured such that said rotor hub is connected, via said connecting element, to said rotor shaft for transmitting torque.

5. The wind power station according to claim 1, wherein said control disk makes friction contact with said cam disk.

6. The wind power station according to claim 1, including a spring element forcing said control disk in a direction toward said cam disk.

7. The wind power station according to claim 6, wherein said cam disk, said control disk and said spring element are disposed and configured such that a holding torque is transmitted to said rotor blade for controlling a position of said rotor blade.

8. The wind power station according to claim 6, wherein said cam disk, said control disk and said spring element are disposed and configured such that a holding torque with a given characteristic is transmitted to said rotor blade and such that an adjustment angle range for said rotor blade is governed by the given characteristic of the holding torque.

9. The wind power station according to claim 1, including:
   a spring element forcing said control disk in a direction toward said cam disk; and
   said spring element being mounted rotatably such that said spring element and said control disk are rotatable.

10. The wind power station according to claim 1, wherein said rotor shaft defines a rotor shaft rotation axis; and
    said control disk defines a control disk rotation axis corresponding to said rotor shaft rotation axis.

11. The wind power station according to claim 1, wherein:
    said rotor blade has a shaft stub with a lower end;
    said cam disk is disposed at said lower end of said shaft stub and is rotationally fixed with respect to said shaft stub; and
    said shaft stub defines a shaft stub axis such that the shaft stub axis coincides with the adjustment axis of said rotor blade.

12. The wind power station according to claim 11, wherein:
    said rotor has a rotor hub with a circumferential wall; and
    said shaft stub is rotatably mounted in said circumferential wall of said rotor hub.

13. The wind power station according to claim 1, wherein said cam disk has a contour profile with two extremes for providing a neutral position for said cam disk on said control disk.

14. The wind power station according to claim 1, including:
    two further rotor blades having respective shaft stubs;
    said rotor having a rotor hub with a circumferential wall; and
    said shaft stubs of said rotor blade and of said two further rotor blades being rotatably mounted in said circumferential wall of said rotor hub.

15. The wind power station according to claim 1, wherein:
    said rotor has a rotor hub; and
    said adjustment device is disposed within said rotor hub.

16. The wind power station according to claim 1, wherein:
    said rotor blade has a pressure point; and
    said rotor blade is disposed such that the pressure point of said rotor blade lags behind the adjustment axis of said rotor blade.

17. The wind power station according to claim 1, wherein:
    said rotor defines a general rotor plane; and
    said rotor blade is inclined such that the adjustment axis of said rotor blade forms an acute angle with the general rotor plane.

18. The wind power station according to claim 1, wherein said adjustment device is configured to control at least one variable selected from the group consisting of a rotation speed and a power of the wind power station.

19. The wind power station according to claim 1, wherein said adjustment device is configured such that a rated power of the wind power station remains substantially constant above a given wind speed.

20. The wind power station according to claim 1, wherein:
    said adjustment device is configured such that said rotor has a relatively higher rate of increase in no-load rotation speed with increasing wind speeds for wind speeds below a given wind speed value; and
    said rotor has a relatively lower rate of increase in no-load rotation speed with increasing wind speeds for wind speeds above the given wind speed value.

21. The wind power station according to claim 1, including at least one further rotor blade.

* * * * *